United States Patent [19]

Rutschmann et al.

[11] Patent Number: 5,063,884
[45] Date of Patent: Nov. 12, 1991

[54] AIR INTAKE SYSTEM OF AN INTERNAL-COMBUSTION ENGINE

[75] Inventors: Erwin Rutschmann, Tiefenbronn; Hans-Georg Breuer, Neuhausen-Steinegg, both of Fed. Rep. of Germany

[73] Assignee: Dr. Ing. h.c.F. Porsche AG, Fed. Rep. of Germany

[21] Appl. No.: 590,795

[22] Filed: Oct. 1, 1990

[30] Foreign Application Priority Data

Sep. 30, 1989 [DE] Fed. Rep. of Germany ....... 3932738

[51] Int. Cl.⁵ ............................................ F02M 35/10
[52] U.S. Cl. ............................. 123/52 M; 123/52 MB
[58] Field of Search ......... 123/52 M, 52 MV, 52 MC, 123/52 MB

[56] References Cited

U.S. PATENT DOCUMENTS

| | | | |
|---|---|---|---|
| 4,763,612 | 8/1988 | Iwanami | 123/52 MV |
| 4,803,961 | 2/1989 | Hiraoka et al. | 123/52 MB |
| 4,889,082 | 12/1989 | Hitomi et al. | 123/52 M |

FOREIGN PATENT DOCUMENTS

| | | | |
|---|---|---|---|
| 0200930 | 11/1986 | European Pat. Off. . | |
| 0312810 | 4/1989 | European Pat. Off. . | |
| 0364770 | 4/1990 | European Pat. Off. | 123/52 M |
| 1669265 | 9/1953 | Fed. Rep. of Germany . | |
| 1941876 | 3/1971 | Fed. Rep. of Germany . | |
| 2322175 | 10/1974 | Fed. Rep. of Germany . | |
| 3424433 | 1/1986 | Fed. Rep. of Germany . | |
| 0173520 | 10/1984 | Japan | 123/52 MB |
| 1-117918 | 5/1988 | Japan . | |
| 1-273827 | 11/1989 | Japan . | |
| 659854 | 12/1978 | Switzerland . | |

*Primary Examiner*—David A. Okonsky
*Attorney, Agent, or Firm*—Evenson, Wands, Edwards, Lenahan & McKeown

[57] ABSTRACT

The air intake system of an internal-combustion engine has a branching between the throttle housing and a collecting tank from which suction pipes lead to the cylinder head of the internal-combustion engine. This branching divides the intake air which flows into it in a single flow and guides it to the collecting tank by way of several lines. This arrangement has a simple construction and causes a torque and power increase over a wide rotational-speed range.

18 Claims, 2 Drawing Sheets

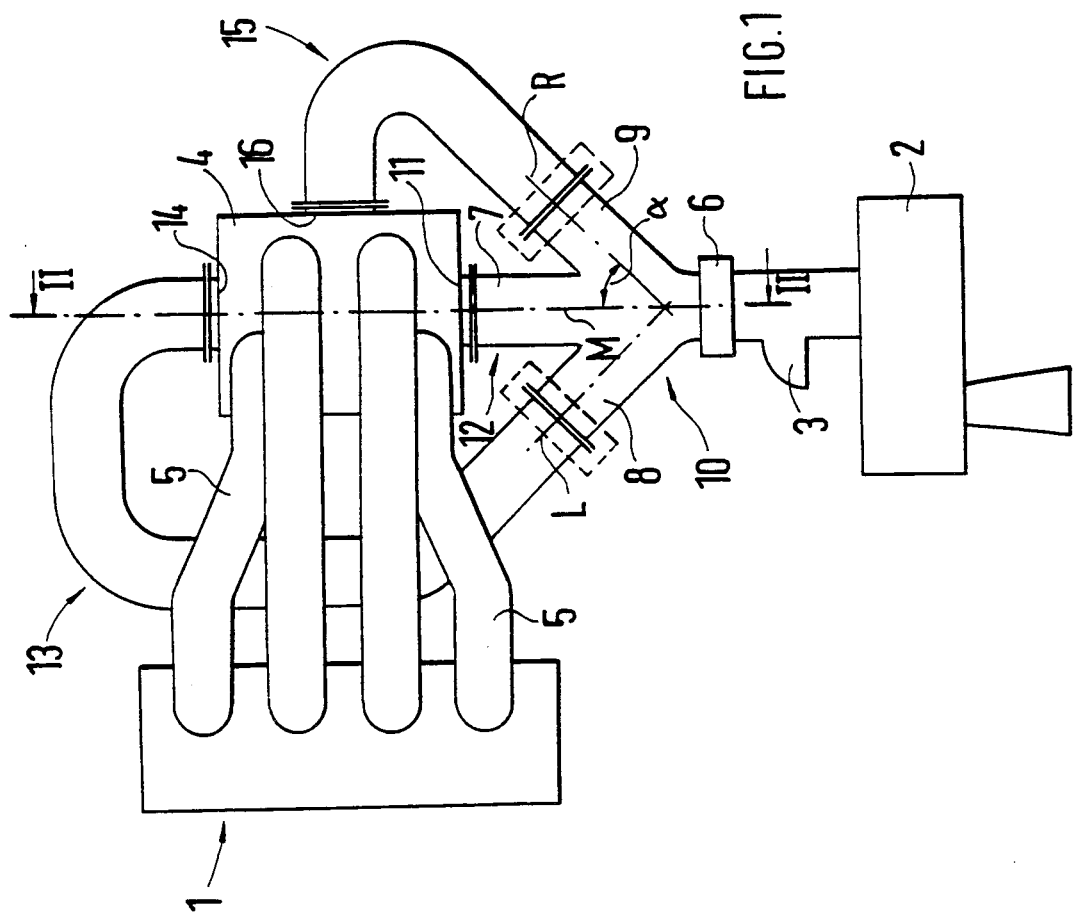

AIR INTAKE SYSTEM OF AN INTERNAL-COMBUSTION ENGINE

BACKGROUND AND SUMMARY OF THE INVENTION

The invention relates to an air intake system of an internal-combustion engine having at least one bank of cylinders in which the intake air flows from an air filter to each bank of cylinders through a measuring device preferably constructed as an air mass sensor and through a throttle housing and from there is guided into a collecting tank which is connected to a cylinder head of the internal-combustion engine by means of suction pipes.

An air intake system having two collecting tanks which are designed as resonance tanks and are connected with one another are known from the German Patent Document DE 34 24 433. In this case, the flow cross-section from one resonance tank to the next resonance tank may be changed by connecting bypass pipes by means of throttle valves. The resulting torque increase may therefore be displaced to different rotational speed ranges.

From the German Patent Document DE-GM 16 69 265, a collecting tank is known which is constructed as a suction manifold which takes in air by way of up to three physically separated inlet openings. These inlet openings are not connected with one another outside the suction manifold and, together with nozzle-type pipes disposed in front of them, are used only as intake noise dampers.

During the operation of an internal-combustion engine, a vacuum occurs at the inlet side as a result of the suction of the individual cylinders; i.e., a demand for air is created in the intake system which increases as the rotational speed increases.

It is an object of the invention to design an air intake system of an internal-combustion engine such that an increase in power and torque is achieved.

This object is achieved by means of an arrangement wherein a branching is arranged between the throttle housing and the collecting tank, from which branching several pipe sockets are connected to the collecting tank in such a manner that the intake air flows into the collecting tank from different directions.

The air intake system according to the invention provides an arrangement in which the air flow which flows from the air filter in a single flow, by means of a measuring device which preferably is constructed as an air mass flow sensor, is branched downstream of the air flow sensor and subsequently, in several flows, is supplied to an individual collecting tank. Individual suction pipes lead from there to the inlet ducts in the cylinder head of the internal-combustion engine. Advantageously, the branching of the intake air, which at first flows through a common pipe, into several partial flows which lead into the collecting tank at physically separate points, results in a clear increase of power and torque over a wide rotational-speed range of the internal-combustion engine.

This increase occurs preferably in internal-combustion engines where the time intervals between the intake strokes are relatively large so that pronounced pressure fluctuations build up in the intake system. This occurs in the case of four-cylinder in-line internal-combustion engines or, for example, in the case of 8-cylinder V-engines with a 180° spark gap. In this case, a separate air intake system is assigned to each cylinder bank.

In the case of the air intake system according to the invention, a direct intake line as well as at least one bypass line leads from the branching into the collecting tank.

In this type of a construction, it was found that a harmonic pressure oscillation occurs along the whole intake path of the air, that is, from the air filter to the inlet valves of the internal-combustion engine, which is in phase with the piston movement in the cylinders of the internal-combustion engine. Compared with known constructions, several advantages are therefore obtained. On the one hand, at the start of each inlet stroke, a lower pressure exists in front of the respective inlet valve which corresponds almost to the pressure in the cylinder, and which therefore is in phase with the pressure course in the cylinder. Furthermore, at the point in time of a maximum piston speed, a higher flow rate exists along the whole length of the suction pipes from the collecting tank to the inlet valve. As a result, a larger amount of air flows to each cylinder. Finally, at the end of the inlet stroke, when the inlet valve reduces the inlet cross-section, a higher pressure exists along the whole length of the suction pipes which results in a better cylinder charging.

In addition, this bypass line requires no control because it connects and disconnects itself because of the geometric design. By means of the connecting of more than one bypass line and its design for various rotational speeds of the internal-combustion engine, an increase of power and torque can be achieved over a wider rotational-speed range. The individual bypass lines are connected during the run through the rotational-speed range of the internal-combustion engine; they reach their maximum contribution to the pressure increase at the respective coordinated rotational speed; and are disconnected again when the rotational speed is increased further.

The invention therefore distinguishes itself by a simple construction. Compared to known intake systems which are controlled by means of several throttle valves and are designed for a tuned intake pressure charging, the invention clearly has fewer parts and therefore has advantages with respect to cost, servicing and weight.

Preferred embodiments of the invention include other advantageous features. In certain embodiments, a branching of the intake air at a small angle which should not exceed 45° leads to optimal results. Equally advantageous is a respective vertical flowing of the intake air into the collecting tank. When two flows flow into the collecting tank, the two flow-in points should be opposite one another; in the case of a three-flow construction, the third flow-in point should be situated perpendicularly with respect to the two flow-in points which are opposite one another.

Other objects, advantages and novel features of the present invention will become apparent from the following detailed description of the invention when considered in conjunction with the accompanying drawings.

BRIEF DESCRIPTION OF THE DRAWINGS

FIG. 1 is a schematic view from above of a preferred embodiment of the invention;

FIG. 2 is a sectional view taken along Line II—II of FIG. 1;

DETAILED DESCRIPTION OF THE DRAWINGS

Figure 3:
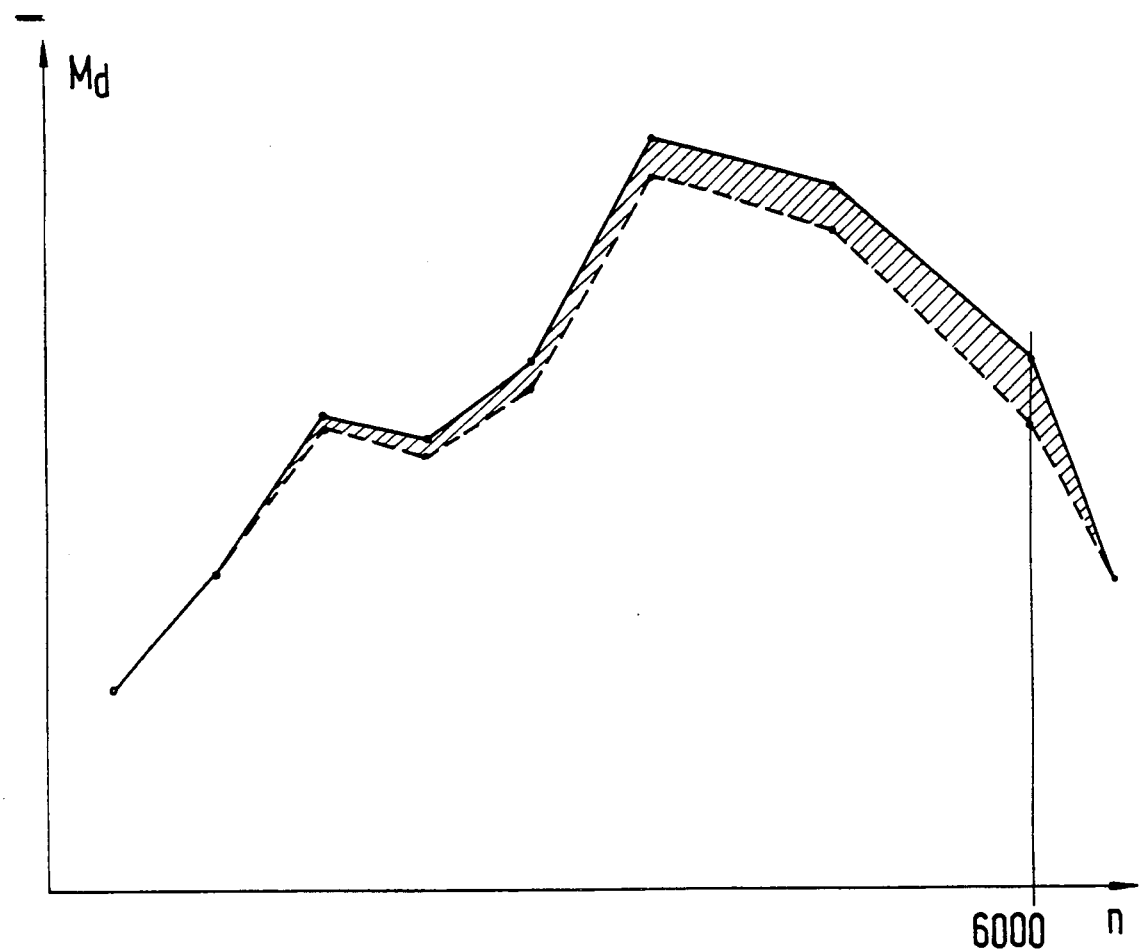
FIG. 3 is a diagram of the course of the torque as a function of the rotational speed comparing a prior art internal-combustion engine and an engine, constructed according to preferred embodiments of the invention.

The air intake system of a four-cylinder internal-combustion engine 1 has an intake air filter 2, an air flow sensor 3, a collecting tank 4 as well as suction pipes 5 which lead from the collecting tank 4 to the inlet ducts in the cylinder head of the internal-combustion engine 1 which are not shown and explained in detail. The power control of the internal-combustion engine 1 takes place by means of a throttle valve arranged downstream of the air flow sensor 3 in a throttle housing 6. A branching 10 having several pipe sockets 7, 8, 9 is arranged following the throttle housing 6. In this case, pipe socket 7 leads the air along a linear path into an inlet opening 11 of the collecting tank 4. A direct intake line 12 is therefore established by means of the design of the pipe sockets between the throttle housing 6 and the inlet opening 11. A first bypass pipe 13 is connected to the angular pipe socket 8 of the branching 10. This bypass line 13 extends around the collecting tank 4 and leads into an inlet opening 14 of the collecting tank 4. The centers of the inlet openings 11, 14 are situated on a common axis M which, at the same time, is the longitudinal center axis of the branching 10. A second bypass line 15 is connected to the angular pipe socket 9 of the branching and leads into an inlet opening 16 of the collecting tank 4. The second bypass line 15 has a shorter construction than the first bypass line 13 and leads laterally into the collecting tank 4.

The flow-in direction of the air flowing through the inlet opening 16 is perpendicular to the axis M. The longitudinal center axes L, R of the pipe sockets 8, 9 are arranged at a small angle α with respect to the longitudinal center axis M and are situated in a common plane E.

The volume of the collecting tank 4 as well as that of the bypass lines 13, 15 are adapted to one another and to the displacement of the internal-combustion engine 1. When the adapting conditions are changed, the bypass lines 13, 15 may, for example, extend directly on the outer surface of the collecting tank 4 and in this case may be constructed in one piece with the collecting tank 4. Likewise, for the targeted connecting and disconnecting of the bypass lines 13, 15, additional throttle housings may be arranged between the pipe sockets 8, 9 and the inlet openings 14, 16. In addition, more than two bypass lines 13, 15 or only one bypass line may be arranged in parallel to the direct intake line 12. In this case, the branching 10 has a corresponding number of pipe sockets. If, because of the narrow space conditions, only one additional pipe socket for a first bypass line can be mounted at the branching 10, an additional bypass line may, for example, be branched off from the first bypass line and may extend to another inlet opening of the collecting tank 4 which is advantageously arranged opposite the inlet opening of the first bypass line.

As a comparison, FIG. 3 shows in a diagram the course of the torque above the rotational speed for a known, single-flow design of the collecting tank 4 in the form of an interrupted line. The drawn-out curve represents a design according to the invention with a bypass line which, with a length of approximately 650 mm, is designed for n=6,000 rpm. The gain in torque is demonstrated by way of the hatched area and rises with the rotational speed shown and reaches its maximum at approximately 6,000 rpm. The increase in torque amounts to approximately 8 newton-meters; the increase in power amounts to approximately 6 kilowatt.

In preferred embodiments, the longer bypass line 13 has a length of between 550 mm and 750 mm, and the flow cross-section of the lines 12, 13, and 15 are approximately the same size as one another with a diameter of 50–70 mm.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. An air intake system of an internal-combustion engine having at least one bank of cylinders in which the intake air flows from an air filter to each bank of cylinders through a measuring device preferably constructed as an air mass sensor and through a throttle housing and from there is guided into a collecting tank which is connected to a cylinder head of the internal-combustion engine by means of suction pipes, wherein a branching is arranged between the throttle housing and the collecting tank, from which branching a plurality of pipe sockets are connected to the collecting tank in such a manner that the intake air flows into the collecting tank from different directions, the plurality of pipe sockets including a first pipe socket connected to a first inlet opening of the collecting tank by a direct intake line and a second pipe socket connected to a second inlet opening of the collecting tank by a bypass line, the center of the second inlet opening being disposed on an extension of the longitudinal center axis of the first pipe socket and on a side of the collecting tank which is opposite the first inlet opening.

2. An air intake system according to claim 1, wherein the branching comprises a direct pipe socket leading to the collecting tank.

3. An air intake system according to claim 2, wherein the plurality of open sockets include angular pipe sockets connected to the branching as a part of bypass lines.

4. An air intake system according to claim 3, wherein the bypass lines are constructed in one piece with the collecting tank.

5. An air intake system according to claim 3, wherein the bypass lines are constructed as a separate connection between the pipe sockets and the collecting tank.

6. An air intake system according to claim 3, wherein intake air flowing into the collecting tank flows in perpendicularly with respect to the walls surrounding the collecting tank.

7. An air intake system according to claim 4, wherein intake air flowing into the collecting tank flows in perpendicularly with respect to the walls surrounding the collecting tank.

8. An air intake system according to claim 5, wherein intake air flowing into the collecting tank flows in perpendicularly with respect to the walls surrounding the collecting tank.

9. An air intake system according to claim 3, wherein the longitudinal center axes of the pipe sockets enclose an acute angle with the longitudinal center axis of the direct pipe socket.

10. An air intake system according to claim 4, wherein the longitudinal center axes of the pipe sockets enclose an acute angle with the longitudinal center axis of the direct pipe socket.

11. An air intake system according to claim 6, wherein inlet openings are arranged in the walls surrounding the collecting tank.

12. An air intake system according to claim 11, wherein the longitudinal center axes of the pipe sockets are disposed in a plane, and wherein the centers of the inlet openings are disposed in said plane.

13. An air intake system according to claim 12, wherein a four-cylinder in-line internal-combustion engine having a collecting tank which has an almost cuboid shape is provided.

14. An air intake system according to claim 12, wherein a four-cylinder in-line internal-combustion engine having a collecting tank which has an almost cuboid shape is provided, wherein the center of the inlet opening assigned to a first bypass line is disposed on the extension of the longitudinal center axis and on a side of the collecting tank which is opposite the inlet opening, and wherein the direction of the intake air flowing in through the inlet opening assigned to a second bypass line extends transversely with respect to the longitudinal center axis.

15. An air intake system according to claim 13, wherein the length of the bypass line amounts to between 550 mm and 750 mm.

16. An air intake system according to claim 14, wherein the length of the bypass line amounts to between 550 mm and 750 mm.

17. An air intake system according to claim 15, wherein the first bypass line has a longer length than the second bypass line.

18. An air intake system according to claim 16, wherein the first bypass line has a longer length than the second bypass line.

* * * * *